(12) United States Patent
Ichige

(10) Patent No.: US 8,141,516 B2
(45) Date of Patent: Mar. 27, 2012

(54) PIG-RAISING METHOD UTILIZING COMBUSTION ASH IN BLENDED FEED AND FLOOR COVERING

(75) Inventor: Toukichi Ichige, Tokyo (JP)

(73) Assignee: Saiseiko Co., Ltd., Tokyo (JP)

( * ) Notice: Subject to any disclaimer, the term of this patent is extended or adjusted under 35 U.S.C. 154(b) by 753 days.

(21) Appl. No.: 11/719,124

(22) PCT Filed: Nov. 9, 2005

(86) PCT No.: PCT/JP2005/020559
§ 371 (c)(1),
(2), (4) Date: Nov. 6, 2008

(87) PCT Pub. No.: WO2006/051829
PCT Pub. Date: May 18, 2006

(65) Prior Publication Data
US 2009/0071409 A1    Mar. 19, 2009

(30) Foreign Application Priority Data
Nov. 12, 2004  (JP) .................................. 2004-328970

(51) Int. Cl.
*A01K 1/02* (2006.01)

(52) U.S. Cl. ........................................ 119/444; 119/447

(58) Field of Classification Search .................... 119/72, 119/444, 447
See application file for complete search history.

(56) References Cited

U.S. PATENT DOCUMENTS

| 3,539,685 | A | * | 11/1970 | de Lisle | 424/724 |
| 5,950,565 | A | * | 9/1999 | Guyot | 119/454 |
| 6,499,433 | B2 | * | 12/2002 | Notenbomer | 119/447 |
| 6,997,139 | B2 | * | 2/2006 | Rapp | 119/665 |
| 7,077,272 | B2 | * | 7/2006 | Shimada | 210/501 |
| 7,683,005 | B2 | * | 3/2010 | Kurihara et al. | 502/208 |
| 2006/0102085 | A1 | * | 5/2006 | Chen | 119/171 |

FOREIGN PATENT DOCUMENTS

| JP | 58-170418 A | 10/1983 |
| JP | 3-123433 A | 5/1991 |
| JP | 7-30159 Y2 | 7/1995 |
| JP | 7-170917 A | 7/1995 |
| JP | 9-169586 A | 6/1997 |
| JP | 2001-17124 A | 1/2001 |

* cited by examiner

*Primary Examiner* — Kimberly Smith
(74) *Attorney, Agent, or Firm* — Lowe Hauptman Ham & Berner, LLP

(57) ABSTRACT

A pig-raising method is provided that decreases the bad odors of pig excreta, improves pig-raising efficiency, and stimulates the growth of the pigs so as to improve the quality of their meat so as to enable pig farmers to obtain good-quality meat. With the pig-raising method of the present invention (1) a pig house is provided with a water-supply system that passes water through first ceramic particles, with said activated water then supplied to pigs for drinking, and (2) pigs are fed a blended feed that consists of ordinary feed and second ceramic particles whose main component is silica obtained from plant materials and which constitutes 0.1%-3.0% of the weight of said blended feed. Further, there is spread over the floors of the pig houses a floor covering that consists of a mixture of sawdust and the second ceramic particles, with said second ceramic particles constituting 1.0%-10% of the weight of said floor covering.

5 Claims, 2 Drawing Sheets

Pig-Raising System (a)

(b)

PIG-RAISING METHOD UTILIZING COMBUSTION ASH IN BLENDED FEED AND FLOOR COVERING

CROSS-REFERENCE TO RELATED APPLICATIONS

The present Application is based on International Application No. PCT/JP2005/020599, filed on Nov. 9, 2005, which in turn corresponds to Japanese Application No. 2004-328970, filed on Nov. 12, 2004, and priority is hereby claimed under 35 USC §119 based on these applications. Each of these applications are hereby incorporated by reference in their entirety into the present application.

TECHNICAL FIELD

This invention relates to a pig-raising method.

BACKGROUND ART

In recent years, large-scale pig-raising has achieved low-cost production, but such a method of raising pigs involves various problems such as negatively impacting the nearby environment, the degradation of meat quality, and deterioration of the pig-raising conditions. Further, pig farmers must make large investments to process the pig excreta that is produced.

As a substance used for improving the health of animals and decreasing animal odors, an animal feed that contains a powder of far-infrared radiative aerolite is disclosed in Japanese Patent No. 2975562. That disclosure states that the addition of 5 g-15 g of the powder to 1 kg of animal feed is appropriate. The disclosure further states that the diameter of a particle of the powder should be 40 µm-50 µm, and that 65% of the aerolite should be silicon dioxide, which allows a dog to keep in good health and eliminates the odors from the dog's body and excreta. The disclosure explains that such effects are brought about by the following mechanism: 4 µm-14 µm infrared rays cause water clusters to be smaller, allowing the water to penetrate into cells more easily; this increases the activation of the cells of the animals that eat the aerolite powder and improves the health of those animals. The disclosure also states that the types of far-infrared radiation materials to be used are granite, ceramics, or tourmaline. The disclosure further states that dog food mixed with far-infrared radiation materials can prevent dogs from becoming obese.

Japanese Unexamined Patent Application Publication No. 9-169586 discloses a method for disposing of the pollutants of livestock-production facilities, where footboards (floor covering) are laid on the floor of the facilities in which livestock is raised. The disclosure states that the floor covering is made from fermented compost mixed with chaff, wood waste, or the like, and that an eluate of a filling material is sprinkled over the footboard. The disclosure further states that pumice that contains a water-dissolving silica component is mixed with the floor covering, and that the eluate of the filling material contains a water-dissolving silica component, which assists in activating the water and thereby increases the number of effective microorganisms, and facilitates the composting of the floor covering. In this disclosure, the floor covering is mixed with the livestock excreta, which is then fermented together with the floor covering, with the mixture turning into a compost. Meanwhile, the water-dissolving silica referred to in the disclosure is made by combining silica, extracted from ore, with pumice.

Patent Document 1: Japanese Patent No. 2975562
Patent Document 2: Japanese Unexamined Patent Application Publication No. 9-169586

SUMMARY OF THE INVENTION

The present invention provides a pig-raising method that decreases the bad odors of pig excreta, improves pig-raising efficiency, and allows pig farmers to obtain good-quality meat by stimulating the growth of pigs so as to improve the quality of their meat.

In one aspect of the invention a method provides a pig house that contains a water-supply system that passes water through first ceramic particles that activate the water, which is then supplied for drinking by the pigs. Pigs are fed a blended feed having ordinary feed and second ceramic particles whose main component is silica obtained from plant materials.

In another aspect of the invention a floor covering blend having second ceramic particles is mixed with sawdust and that is spread throughout the pig house.

In another aspect of the invention plant materials that include chaff and/or soybean skins.

In another aspect of the invention the floor covering blend with the second ceramic particles constitutes 1%-10% of the total weight of the blend.

In yet another aspect of the invention the blended feed with the second ceramic particles constitutes 0.1%-3.0% of the total weight of the blended feed.

In still another aspect of the invention the second ceramic particles contain phosphorus pentoxide.

In still another aspect of the invention the second ceramic particles consist of minute particles that can pass through an 8000 mesh.

In yet another aspect of the invention a hollow column is filled with the first ceramic particles and through which water passes, with the first ceramic particles vibrating due to the passing of the water through the first ceramic particles.

In yet another aspect of the invention the first ceramic particles, are calcined at 1500° C.-2000° C.

in yet another aspect of the invention a method whereby the water supplied from the water-supply system is sprinkled throughout the pig house.

SUMMARY OF THE INVENTIONS

A pig house has a water-supply system that activates water provides a favorable place for raising pigs, because such pig houses allow the activated water to be always available for drinking by pigs and for washing the pig house. Also, providing activated water to pigs for drinking improves the pigs' metabolism and stimulates the pigs' growth, which improves the quality of their meat. Also, feeding the pigs feed that is blended with the second ceramic particles, whose main component is silica obtained from plant materials, further stimulates the growth of the pigs, which further improves the quality of their meat.

A blend of sawdust and the second ceramic particles that is spread over the floor covering of a pig house absorbs the odors from the pigs' excreta, and that decreases the pigs' stress that results from such odors, and it reduces the pig house's negative effect on the nearby environment.

Chaff and the skins of soybeans, which are plant materials, contain much silica, and the silica is suitable as the main component of the second ceramic particles.

To eliminate odors from excreta and to be suitable as a floor covering, the second ceramic particles should constitute 1%-10% of the total weight of the mix of the second ceramic particles and sawdust.

To favorably stimulate the growth of pigs, the second ceramic particles are preferably 0.1%-3.0% of the total weight of the blended feed that consists of an ordinary feed and the second ceramic particles.

Second ceramic particles that contains phosphorus pentoxide both eliminate odors and stimulate the growth of pigs.

Second ceramic particles formed as minute particles that can pass through an 8000 mesh can be mixed with ordinary feed to make a blended feed, and can be mixed with sawdust to provide a suitable floor covering.

The water-supply system includes a water activator that is filled with the first ceramic particles and that, by passing water through the first ceramic particles, allows the first ceramic particles to collide with each other, thereby activating the water.

The first ceramic particles can be formed as spherical ceramic particles that activate water by being calcined at 1500° C.-2000° C.

Moreover, sprinkling activated water in the pig house helps to keep the inside of the pig house clean, which decreases odors from the pigs' excreta.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

| Explanations of Numerals | |
|---|---|
| 1 | Lactation period |
| 2 | Young-pigs feeding period |
| 3 | Adult-pigs feeding period |
| 10 | Water activator |
| 11 | Column |
| 12 | First ceramic particles |
| 13 | Direction of flow of water |
| 14 | Water pipe |
| 15 | Partition plate |

DETAILED DESCRIPTION OF THE INVENTION

The preferred embodiment of the pig-raising method includes pig houses consisting of young-pig houses for feeding young pigs and adult-pig houses for feeding adult pigs. Further, a water-activation unit (water activator) that stores first ceramic particles is provided at the pipe arrangement of the water supply system so as to supply the pigs with activated drinking water that stimulates the growth of the pigs. Further, the adult-pig houses are constructed separately from the young-pig houses and are provided with a sawdust floor covering that is a powdered blend of sawdust and the second ceramic particles and that is spread over the floors of the houses. The second ceramic particles contain, as their main component, silica obtained from plant materials, and are mixed with ordinary feed to make a blended feed that is fed to the pigs.

EXAMPLE 1

A pig usually weighs about 1.4 kg at birth and is shipped for meat purposes at about six months after birth, when it weighs more than 110 kg. However, a pig's rate of growth and the quality of its mat greatly vary, depending on the type of feed it receives and the comfortableness of the pig house in which it is raised. The following represent observations of the growth process of pigs depending on variations in the pig-raising conditions.

Figure 1:
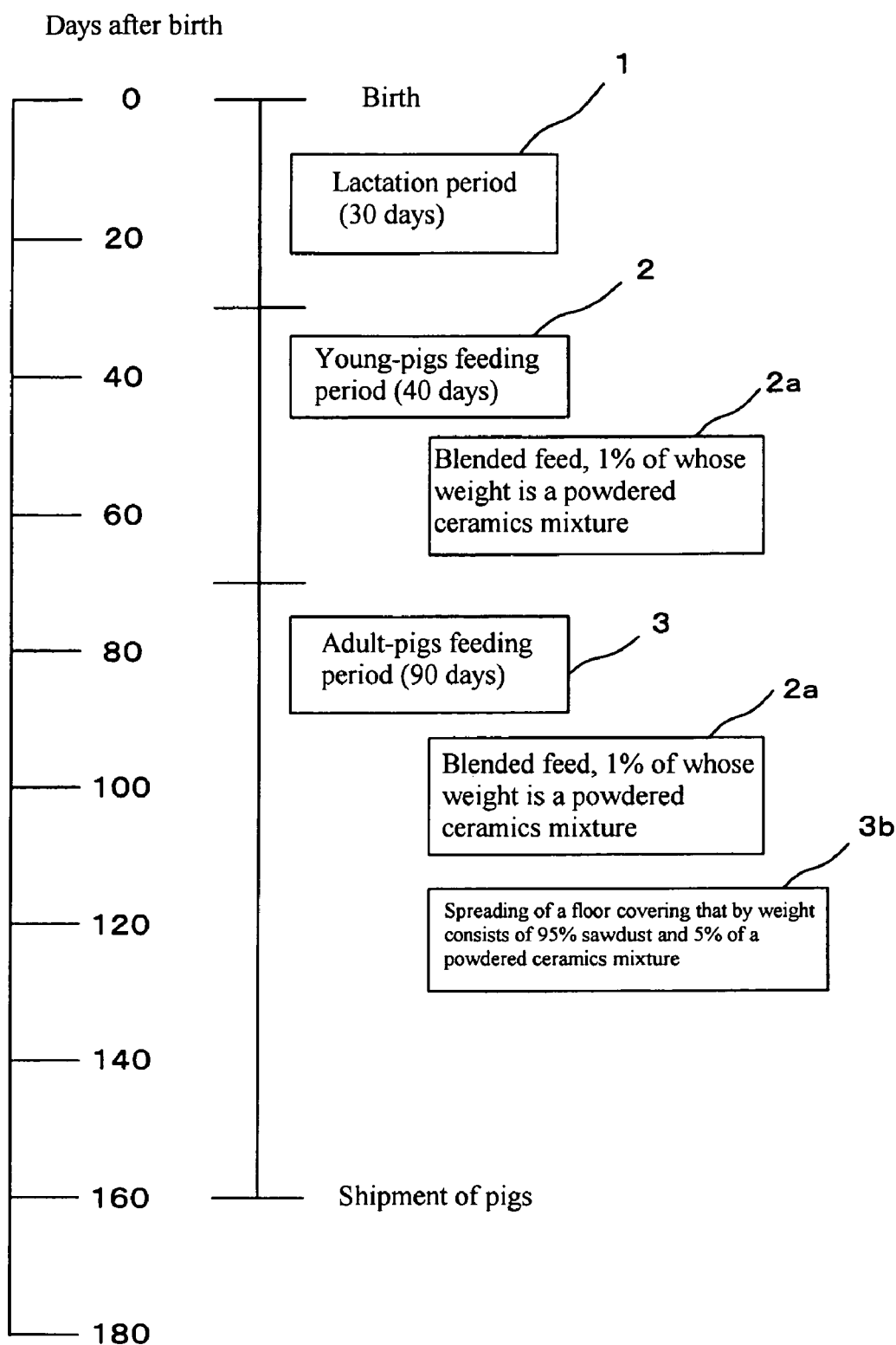
FIG. 1 illustrates a pig-raising method.

FIG. 1 shows the pig-raising method of the present invention, illustrating how the pig-raising process varies according to the pig-raising conditions. As shown in FIG. 1, the lactation period 1 of a pig is 30 days after birth, the following 40 days constitute the young-pigs feeding period 2, and the following 90 days constitute the adult-pigs feeding period 3. Further, during the young-pigs feeding period 2 and the adult-pigs feeding period 3, the pigs are fed ordinary feed blended with 1% powdered ceramics (Block 2a). During the adult-pigs feeding period 3, a sawdust floor-covering mixed with 5% powdered ceramics is spread over the floor of the pig house (Block 3a). Incidentally, during the period for feeding pigs, water processed by the water activator is supplied to the pigs for drinking.

This provides the following variety of pig-raising conditions. Condition 1: 30 days after birth, begin supplying young pigs with feed blended with 1% powdered ceramics; Condition 2: Supply activated water to the pigs for drinking; Condition 3: Provide a floor covering by mixing sawdust with 5% powdered ceramics.

Table 1 compares the growth of pigs before and after the above-mentioned three conditions have been applied.

TABLE 1

| | Before Conditions Applied | After Conditions Applied |
|---|---|---|
| Period for feeding | 185 to 200 days after birth | 160 to 170 days after birth |
| Average weight of pig | 110 kg-115 kg | 115 kg-120 kg |
| Meat quality | Fine | Finer than "before installation" |
| Bad odors | Present | None |

As the above Table 1 shows, the results of growing pigs after all of the above three conditions have been applied are so positive that the period at which the pigs can be shipped for processing into meat is reduced from 185 days-200 days after birth to 160 days-170 days after birth (shortening of the feeding period). Further, the average weight at the time of shipment has improved an average by about 5 kg, from 110 kg-115 kg to 115 kg-120 kg. In addition, the personnel costs for raising the pigs "After Conditions Applied" are less than "Before Conditions Applied," and the offensive odors of pig houses have been eliminated as well.

The above-mentioned powdered ceramics (second ceramic particles), which contain silica obtained from plant materials as the main component, can stimulate the growth of pigs when blended with feed. The following are the chemical components of the powdered ceramics: silica ($SiO_2$), 63.48%; aluminum oxide ($Al_2O_3$), 9.46%; iron oxide ($Fe_2O_3$), 1.51%; calcium oxide (CaO), 1.80%; magnesium oxide (MgO), 15.66%; potassium oxide ($K_2O$), 0.02%; sodium oxide ($Na_2O$), 0.04%; manganese oxide (MnO), 0.02%; phosphorus pentoxide ($P_2O_5$), 0.16%; and titanium oxide ($TiO_2$), 0.35%.

The silica of the above-mentioned powdered ceramics is extracted from plants that contain silica component, such as the chaff or straw of rice, wheat, and the like; bamboo grass leaves; Indian corn; the leaves or stems of scouring rushes; the skins of soybeans; and so on. Chaff contains an especially large amount of silica, and silica constitutes about 60% by weight of its combustion ash. Incidentally, among other inorganic oxides contained in chaff are potassium, sodium, magnesium, and calcium. The processing steps for extracting silica from such chaff are as follows: (a) apply pressure to the chaff; (b) boil the chaff for about two hours in water that contains 10% hydrochloric acid; and (c) calcine the chaff at 600° C. White, amorphous, carbon-free silica is thus obtained. By combining various ingredients (mainly chaff), the powdered ceramics of the present invention are produced as porous particles having an 8000-mesh diameter.

Figure 2:
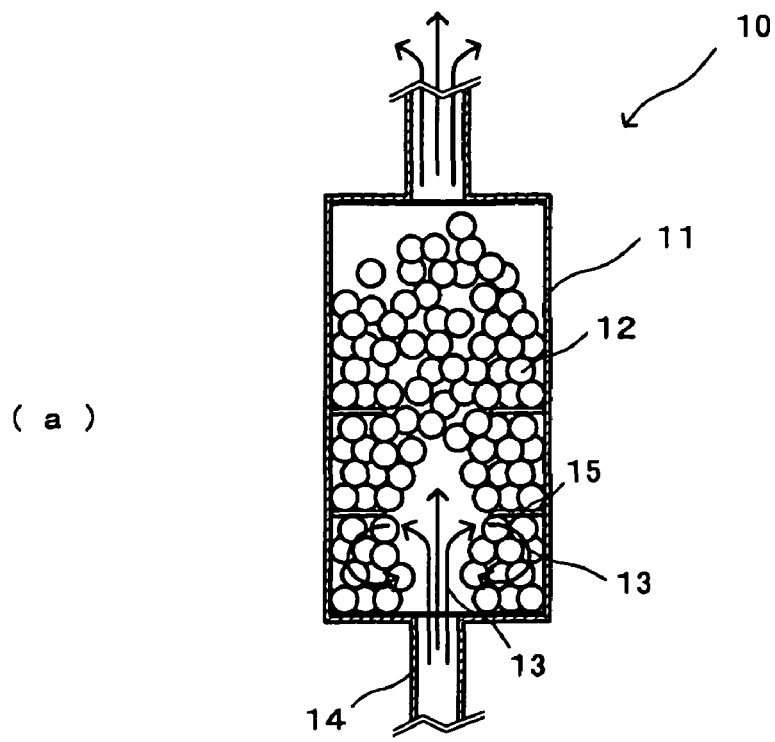
FIGS. 2(a) and 2(b) are show the internal structure of a first water activator and a second water activator, respectively.
Figure 2:
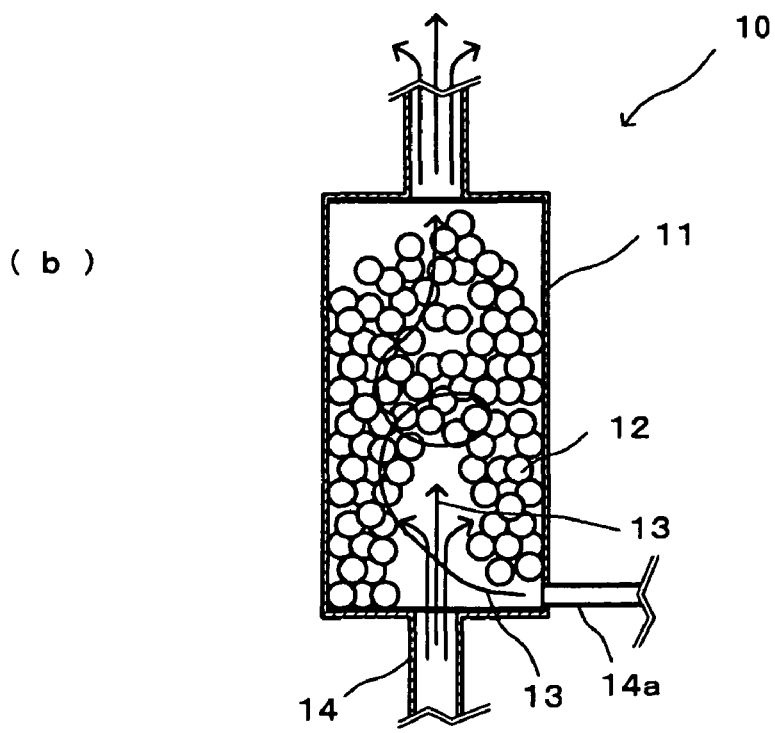

Next will be explained Condition 2, shown in FIG. 2(a) and FIG. 2(b), and which involves supplying, for drinking by the pigs, water processed by the water activator 10. The water activator 10 provides a water-activation unit at a part of the water pipe 14 of the water supply system by filling such part with first ceramic particles 12 that activate the water. This water-activation unit is formed by (1) storing the first ceramic particles 12 within a hollow column 11 in such a way that the filled first ceramic particles 12 are prevented from flowing out of the column 11, and (2) providing filters by which impurities and the like are filtered out both in front of and behind the first ceramic particles 12. The first ceramic particles 12 fill the column 11 and are provided with space between them so as to allow them to collide with each other. That is, the ceramic particles make perpetual vibrational contact with water due to the passing of the water, obtain the energy generated by the collisions of the ceramics, and activate the water by that energy. This is achieved by providing a water pipe 14 at the bottom of the column 11, and allowing ceramic particles 12 to float with the force of the water flow 13, as shown in FIG. 2(a). In this case, the partition plate(s) can be provided on the inside surface of the column 11. If the partition plate(s) is/are provided in this way, the water flow 13 in the upward direction is turned back along the way and swirls vertically, which allows the water to increase its contacts with the first ceramic particles 12.

FIG. 2(b) shows that a water pipe 14a is provided on the sidewall of the column 11, branching from the main water pipe 14. This water pipe 14a is mounted on the sidewall of the column, which is formed in the shape of cylinder, so that the water flows into the column tangentially to the bottom surface of the column. This allows the water to move upward spirally along the inner wall of the column 11. The water flow 13 that is formed as described above allows the first ceramic particles 12 to make complex movements, which causes frequent collision of the ceramic particles with each other and increases the particles' contacts with the water. Incidentally, pumps and the like can be used for pulsing out the water from the bottom of the column as a means for increasing the collisions among the first ceramic particles 12.

The ceramic particles that activate the water (the first ceramic particles) contain the components specified below and are calcined at 1550° C.-2000° C. so as to form a sphere having a particle diameter of 3 mm-20 mm. The chemical components of the ceramics (first ceramic particles) are: silica ($SiO_2$), aluminum oxide ($Al_2O_3$), iron oxide ($Fe_2O_3$), titanium oxide ($TiO_2$), calcium oxide (CaO), potassium oxide ($K_2O$), sodium oxide ($Na_2O$), magnesium oxide (MgO), and manganese oxide ($MnO_2$). Incidentally, water activated by the first ceramic particles stimulates the growth of pigs. Further, because the activated water has antimicrobial properties, sprinkling the water in the pig house as a washing water helps to keep the inside of the pig house clean. The present embodiment used the activated water as a washing water.

This washing water shows antimicrobial action against *Escherichia coli* and *Staphylococcus aureus*, as shown in Tables 2 and 3 below.

TABLE 2

*Escherichia coli*
Initial number of bacteria: 550,000/mL

| | Number of bacteria after the time elapsed (per mL) | | | | |
|---|---|---|---|---|---|
| | 1 min | 10 min | 30 min | 60 min | 24 hrs |
| Test solution | 430,000 | 280,000 | 88,000 | 11,000 | 0 |
| Blank determination | 540,000 | 620,000 | 790,000 | 8,900,000 | 22,000,000 |

TABLE 3

*Staphylococcus aureus*
Initial number of bacteria: 320,000/mL

| | Number of bacteria after the time elapsed (per mL) | | | | |
|---|---|---|---|---|---|
| | 1 min | 10 min | 30 min | 60 min | 24 hrs |
| Test solution | 250,000 | 220,000 | 100,000 | 11,000 | 0 |
| Blank determination | 300,000 | 340,000 | 320,000 | 380,000 | 1,300,000 |

Tables 2 and 3 show culture tests of *Escherichia coli* and *Staphylococcus aureus*. As shown in Tables 2 and 3, no *Escherichia coli* or *Staphylococcus aureus* remained after 24 hours. Further, the test solution shown in the Tables 2 and 3 were prepared by putting 163.5 g of the first ceramic particles into 250 mL of a test bacteria solution, agitating the solution for 30 seconds, and keeping the same standing at 35° C. Further, the steps for preparing the test bacteria solution are as follows: (a) transplant *Escherichia coli* or *Staphylococcus aureus* into a nutrient agar medium; (b) culture the bacteria for 24 hours at 35° C.; (c) inoculate one colony with nutrient broth; (d) culture with shaking for 18 hours at 35° C.; (e) repeat a 10-fold dilution of the solution with a phosphate buffer; and (f) adjust the solution as a $\frac{1}{500}$-concentration nutrient broth at the final stage of the dilution. The specific types of bacteria used were *Escherichia coli* IFO 3972 and *Staphylococcus aureus* IFO 12732.

Next, Condition 3, providing a floor covering by mixing sawdust with 5% powdered ceramics, will be explained as used in this embodiment. This floor covering is spread 70 days after the birth of the pigs, when young pigs have grown into adult pigs. Moreover, the powdered ceramic particles that are mixed with the floor covering of sawdust are the same as those that are blended with the pigs' feed. These powdered ceramic particles, when mixed with sawdust, eliminate the odors originating from excreta. Further, although the powdered ceramic particles are tainted with excreta when mixed with sawdust, it can be made into good-quality manure by thoroughly mixing the ceramics and the excreta so as to form a fertilizer.

The reason why use of a floor covering that consists by weight of 95% sawdust and 5% of powdered ceramic particles greatly reduces the personnel costs of pig farming will now be explained. This floor covering mixture is spread in a thickness of 40 cm-50 cm, which typically eliminates the need to change the sawdust during the period from the initial stage of pig adulthood to the time of shipment. However, pigs have the habit of passing excreta at a single spot only, which causes that spot to become damp, and therefore it is necessary to turn the floor covering of that spot upside down once or twice each month. At that time, sprinkling of 10 kg-20 kg of the powdered ceramic particles over each 100 m² of the floor covering eliminates the bad odors and provides a favorable pig-raising environment. As indicated above, Condition 3 results in such advantages as reducing the time and effort required for cleaning the excreta that accumulates in a pig house, thereby reducing the cost of processing the excreta, and reducing the cost of the personnel who take care of the pigs.

Table 4 presents the comparative test results relating to Experimental Group 1 and Experimental Group 2, when the pigs in Experimental Group 2 were fed under the conditions of Example 1 (including Conditions 1 to 3), while the pigs in Experimental Group 2 were not fed under those conditions.

TABLE 4

|  | Experimental Group 1 | Experimental Group 2 |
|---|---|---|
| Weight increase per day (kg) | 0.731 | 0.787 |
| Days before attaining a weight of 105 kg (days) | 181.55 | 168.27 |
| Average weight ay shipment (kg) | 99.63 | 109.03 |

As shown in Table 4, the pigs in Experimental Group 2 increased in weight by 0.056 kg more per day than did the pigs in Experimental Group 1, which shortened by 13.28 days the time needed to attain a weight of 105 kg and resulted in an increase of 9.40 kg in their average weight at the time of shipment 1. These improvements in pig-raising efficiency were achieved by changing the pig-raising conditions as shown in Example 1.

As described above, the change in pig-raising conditions improved farming efficiency. Further, the pig-raising method of the present invention benefits the neighborhood environment by preventing bad odors.

Moreover, Table 5 shows the results of an analysis of the components of the meat of 12 pigs, among which 6 pigs were selected from Pig House 1 and the other 6 pigs were selected from Pig House 2. The pigs of the Pig House 1 in Table 5 were fed under Conditions 1, 2, and 3 of Example 1. In contrast, the pigs of Pig house 2 were fed using the conventional farming method, which does apply Conditions 1, 2, or 3. Incidentally, the subject pigs were Australian Landrace pigs.

TABLE 5

| Pig House No. | Pig No. | Water Moisture (%) | Ash (%) | Protein (%) | Fat (%) |
|---|---|---|---|---|---|
| 1 | 1 | 71.68 | 1.76 | 23.12 | 1.22 |
|  | 2 | 71.89 | 1.37 | 22.11 | 1.89 |
|  | 3 | 73.81 | 1.37 | 22.70 | 1.57 |
|  | 4 | 71.79 | 1.05 | 23.19 | 2.58 |
|  | 5 | 71.48 | 1.13 | 20.12 | 2.45 |
|  | 6 | 73.20 | 0.71 | 20.01 | 1.18 |
|  | Average | 72.31 | 1.23 | 21.88 | 1.82 |

TABLE 5-continued

| Pig House No. | Pig | Water Moisture (%) | Ash (%) | Protein (%) | Fat (%) |
|---|---|---|---|---|---|
| 2 | 1 | 64.87 | 1.69 | 23.36 | 3.59 |
|  | 2 | 66.84 | 1.64 | 23.63 | 3.58 |
|  | 3 | 71.43 | 1.70 | 23.36 | 2.20 |
|  | 4 | 70.34 | 1.76 | 23.05 | 1.65 |
|  | 5 | 70.26 | 2.10 | 22.84 | 1.57 |
|  | 6 | 65.22 | 1.89 | 22.07 | 3.47 |
|  | Average | 68.16 | 1.80 | 23.05 | 2.68 |

As shown in Table 5, the average fat component of the pigs that wee fed under all three Conditions 1, 2, and 3, was 1.82% 0.86% lower than the 2.68% of pigs fed without such conditions, thus improving the meat quality of the former pigs.

Industrial Applicability

The first and the second ceramic particles can be used for the raising of livestock in general, including cows, not just for raising pigs. If such first and second ceramic particles are used for raising cows, for example, the growth of cows will be stimulated, and the quality of their meat will be improved as well.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. A pig-raising method, comprising:

providing a pig house with a water-supply system and a feeding system, said water-supply system including a plurality of ceramic particles calcined at 1500° C. through 2000° C.; and supplying water that is passed through said ceramic particles for pigs to drink;

feeding the pigs a blended feed including combustion ash which constitutes approximately 0.1%-3.0% of a total weight of the blended feed, said combustion ash being made by boiling in hydrochloric acid and then calcining at least one of plant materials including chaff of rice, chaff of wheat, and skins of soybeans;

mixing said combustion ash with sawdust to produce a mixture of said combustion ash and the sawdust, said mixture constituting approximately 1%-10% of the total weight of the blend feed; and spreading said mixture of said sawdust and said combustion ash for use as a floor covering.

2. The pig-raising method according to claim 1, wherein said combustion ash is white porous particles that are passable through an 8000 mesh.

3. The pig-raising method according to claim 1, wherein said water-supply system includes a water-activation unit and a water pipe connected with the water-activation unit, and said method further comprises storing the ceramic particles in the water-activation unit; and supplying water into the water-activation unit through the water pipe, wherein the ceramic particles are spaced from each other so as to allow the ceramic particles to collide with each other due to the passing of the water, to obtain energy generated by collisions of the ceramics particles, and to activate the water by the energy.

4. The pig-raising method according to claim 3, wherein the water pipe is connected to the water-activation unit at a bottom portion of the water-activation unit to allow the ceramic particles to float at a top portion of the water-activation unit due to a water flow of the water from the bottom.

5. The pig-raising method according to claim 4, wherein
the water-supply system further comprises a partition member in the water-activation unit, and
the water flow flowing from the bottom portion to the top portion of the water-activation unit is turned back by the partition member to increase contact between the water and the ceramic particles.

* * * * *